United States Patent
Alsayegh et al.

(10) Patent No.: US 12,246,973 B1
(45) Date of Patent: Mar. 11, 2025

(54) SOLAR STILL WATER TREATMENT USING CARBON-BASED EFFERVESCENT TABLETS AND RELATED METHODS

(71) Applicant: KUWAIT UNIVERSITY, Safat (KW)

(72) Inventors: Naser Alsayegh, Safat (KW); Nawaf F. Aljuwayhel, Safat (KW); Maryam Jamali, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/666,495

(22) Filed: May 16, 2024

(51) Int. Cl.
  *C02F 1/52* (2023.01)
  *C02F 1/14* (2023.01)
  *C02F 1/54* (2023.01)
  *C02F 103/08* (2006.01)

(52) U.S. Cl.
  CPC .............. *C02F 1/5245* (2013.01); *C02F 1/14* (2013.01); *C02F 1/54* (2013.01); *C02F 2001/5218* (2013.01); *C02F 2103/08* (2013.01); *C02F 2305/08* (2013.01)

(58) Field of Classification Search
  None
  See application file for complete search history.

(56) References Cited

U.S. PATENT DOCUMENTS

| | | | |
|---|---|---|---|
| 5,023,012 A | * | 6/1991 | Buchan .................. C02F 1/5236 210/732 |
| 8,075,799 B2 | | 12/2011 | Hong et al. |
| 9,884,265 B2 | | 2/2018 | Park et al. |
| 10,233,095 B1 | | 3/2019 | Haidar |
| 2007/0253888 A1 | | 11/2007 | Liu et al. |
| 2015/0291463 A1 | | 10/2015 | Chen et al. |
| 2021/0179453 A1 | | 6/2021 | Qu et al. |

OTHER PUBLICATIONS

Ali, et al. "Effervescent tablets for carbon-based nanofluids production." Journal of Molecular Liquids 390 (2023): 123083.
Ali, "Graphene-based nanofluids: production parameter effects on thermophysical properties and dispersion stability." Nanomaterials 12.3 (2022): 357.
Ali, et al. "Carbon-based nanofluids and their advances towards heat transfer applications—a review." Nanomaterials 11.6 (2021): 1628.

* cited by examiner

*Primary Examiner* — Peter Keyworth
(74) *Attorney, Agent, or Firm* — Nath, Goldberg & Meyer; Joshua B. Goldberg (57) ABSTRACT

A water desalination system and process are provided in which a suspension is fed into a water desalination chamber from a source container. At least one effervescent tablet is introduced into a base fluid within the source container to form the suspension. The effervescent tablet serves to increase the heat absorption of the base fluid and enhance the efficiency of the water desalination process. The effervescent tablet used in the process may include multi-walled carbon nanotubes (MWCNT) as well as one or more surfactants and/or effervescent agents such as sodium dodecyl sulfate, monosodium phosphate, and sodium carbonate. Introduction of the effervescent tablet into the base fluid may result in the growth of crystals within the suspension. The presence of crystals in the suspension serving to further enhance the solar radiation and heat absorbance of the base fluid.

13 Claims, 8 Drawing Sheets

SOLAR STILL WATER TREATMENT USING CARBON-BASED EFFERVESCENT TABLETS AND RELATED METHODS

BACKGROUND OF THE INVENTION

Field of the Invention

The disclosure of the present patent application relates to water treatment systems, and particularly to a solar still water desalination system using effervescent tablets to increase heat absorption of the source fluid.

Description of Related Art

A solar still water treatment unit is a device designed to produce fresh water from saltwater, wastewater, or other contaminated water using energy from sunlight. The process relies on the principles of evaporation and condensation to purify the water. Essentially, water, such as saltwater or other contaminated water, is heated by the sun, causing it to evaporate and leave behind salt or other impurities. The water vapor then condenses on a surface within the still, such as a tilted or hemispherical transparent cover, where it forms droplets of freshwater. These droplets are collected and channeled into a reservoir, providing a source of clean drinking water.

Solar still water treatment units, while offering a sustainable and energy-efficient method for producing freshwater from saltwater, do face several challenges and shortcomings. In particular, solar stills often have relatively low efficiency in converting saltwater into freshwater, resulting in limited production rates compared to other water treatment or desalination methods. New systems and methods are desirable for increasing the evaporation rate of source water in solar still water desalination units leading to increased efficiency and output.

SUMMARY OF THE INVENTION

In a first embodiment, the present disclosure is directed towards a water desalination process in which a suspension is fed into a water treatment chamber from a source container. The water desalination process includes introducing at least one effervescent tablet into a base fluid within the source container to form the suspension. The introduction of the effervescent tablet into the base fluid serves to increase the heat absorption of the base fluid and enhance the efficiency of the water desalination process. The process further includes regulating a fluid level in the water desalination chamber using a valve to automatically introduce additional suspension from the source container and heating the suspension fluid in the water desalination chamber to create vapor. The vapor condenses on the walls of the water desalination chamber after which the condensate is collected and directed towards a collection trough. The effervescent tablets used in the process may include a nanomaterial having a higher thermal conductivity than the base fluid such as for example multi-walled carbon nanotubes (MWCNT). In a non-limiting example, the volume percent of multi-walled carbon nanotubes in the base fluid may be at least 0.10%. In a further non-limiting example, the volume percent of multi-walled carbon nanotubes in the base fluid may be at least 0.15%.

In addition to multi-walled carbon nanotubes, the effervescent tablet used in the process may include one or more surfactants and/or effervescent agents including but not limited to sodium dodecyl sulfate, monosodium phosphate, and sodium carbonate. In a non-limiting example, the effervescent tablet may include multi-walled carbon nanotubes, sodium dodecyl sulfate, monosodium phosphate, and sodium carbonate in a weight ratio of about 1:1:5:2.26.

The water desalination process may include forming one or more crystals within the suspension as a result of the introduction of the effervescent tablet into the base fluid. The presence of crystals in the suspension serves to further enhance the solar radiation and heat absorbance of the base fluid.

The water desalination process includes heating the suspension fluid in the water desalination chamber by solar radiation passing through a transparent window of the water desalination chamber. The process may further include heating the suspension in the source container by solar radiation.

In a further embodiment, a water desalination process is provided including introducing at least one effervescent tablet into a source container holding a base fluid to form a suspension, exposing the suspension in the source container to solar radiation, feeding the suspension into a water desalination chamber, and regulating a fluid level in the water desalination chamber using a valve to automatically introduce additional suspension from the source container. The process further includes heating fluid in the water desalination chamber by solar radiation entering through a transparent window to create vapor, collecting vapor condensate formed on one or more walls of the water desalination chamber, and forming one or more crystals in the suspension as a result of introducing the effervescent tablet.

In a further embodiment, a water desalination system is provided including a source fluid container, a base fluid held within the source container, as well as a water desalination chamber including at least one transparent window for introduction of solar radiation. One or more conduits may be included which feed liquid from the source container to the water desalination chamber. A condensate collection trough is included for collecting condensate formed in the water desalination chamber, as well as a valve for regulating introduction of fluid from the source container into the water desalination chamber and the fluid level within the water desalination chamber. One or more effervescent tablets are included in the system, the one or more effervescent tablets introduced into a base fluid within the source container to form a suspension. The water desalination system may include one or more crystals formed within the suspension as a result of the introduction of the effervescent tablet. A condensate tank may be included for storage of condensate formed within the water desalination chamber. A brine storage tank may be included for storage of brine formed by the water desalination chamber.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 1:
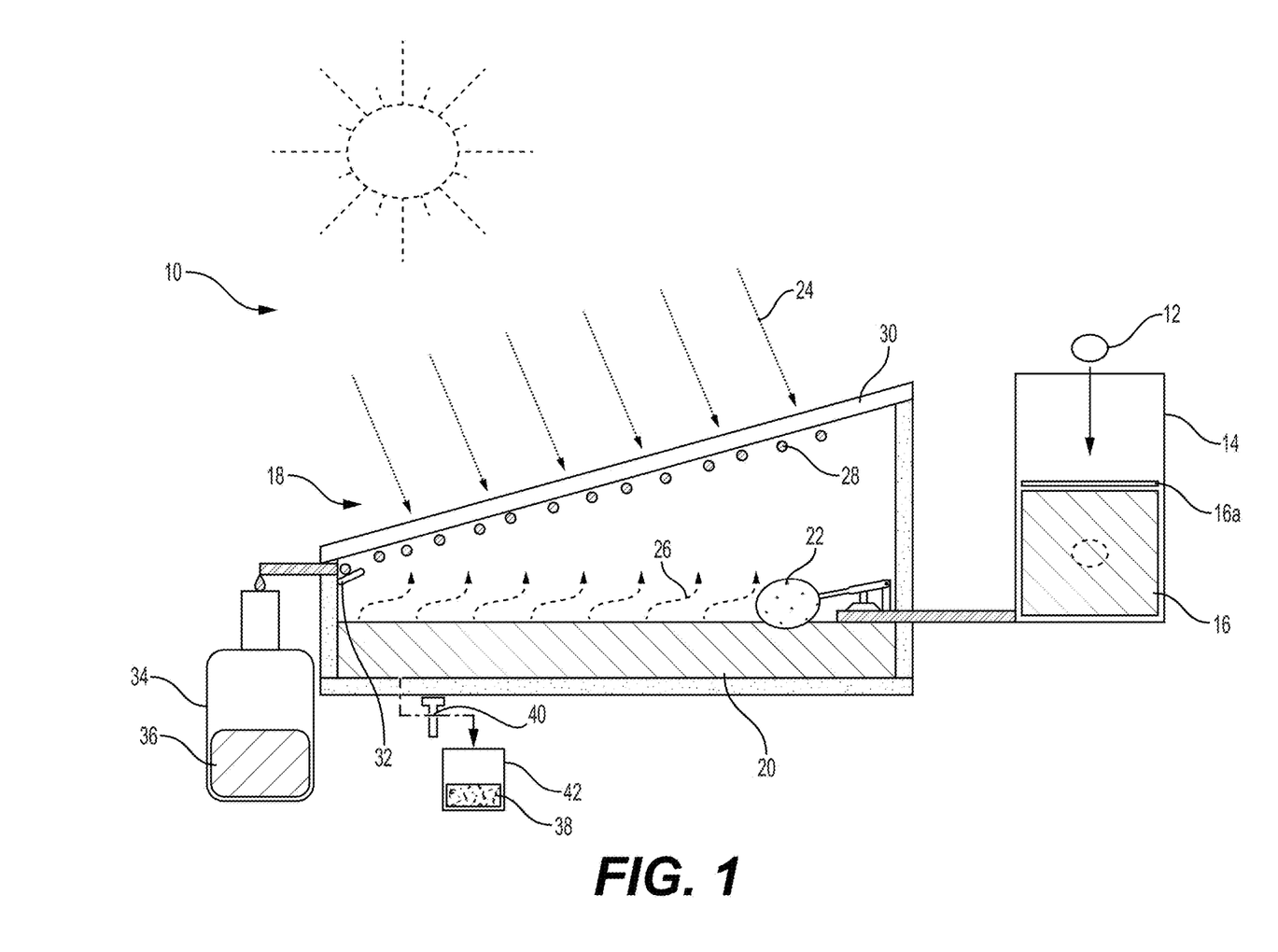
FIG. 1 is a left side cutaway view of a solar still water desalination system using an effervescent tablet according to the disclosure.

FIG. 1 illustrates a water desalination system 10 as used in the water desalination process disclosed herein. The water desalination process begins by introducing an effervescent tablet 12 into a source container 14 containing a base fluid. A suspension 16 is formed as a result of the introduction of effervescent tablet 12 into the base fluid of source container 14. The effervescent tablet contains nanoparticles having a higher thermal conductivity than the base fluid of source container 14. Such nanoparticles may be for example, metals, metal oxides, and carbons such as carbon black, graphene, carbon nanotubes, and carbon nanofibers. In addition to increased thermal conductivity, nanofluids such as those containing carbon exhibit strong light absorption capabilities due to their electronic structure and high aspect ratios.

In a non-limiting example, the base fluid of source container 14 is seawater to be used in a desalination process. However, other water such as brackish water, wastewater, rainwater, or other contaminated water may also serve as the base fluid to be treated by the system 10. One or more crystals or crystallization layers are represented as 16a, which may form as a result of the introduction of effervescent tablet 12 into the base fluid and the formation of suspension 16. Greater detail will be provided later in the disclosure regarding the formation of crystals 16a.

From source container 14, suspension 16 is fed to water desalination chamber 18. A valve, such as a float valve 22 regulates the fluid 20 within the water desalination chamber 18. Float valve 22 opens when the amount of fluid 20 drops below a predetermined level. Within desalination chamber 18, fluid 20 is heated by solar radiation 24 passing through at least one transparent window 30. The heated fluid forms a vapor 26 which gathers on the inner surface of the walls of desalination chamber 18 as condensate 28. Condensate 28 is collected by one or more troughs 32 and passed to a treated water storage container 34. The collected water 36 may be used as a suitable source of drinking water. A drain 40 may be provided leading to container 42 for storage of brine 38.

In a non-limiting example, the effervescent tablet 12 may be fabricated via homogeneously mixing multi-walled carbon nanotubes (MWCNTs), sodium dodecyl sulfate (SDS), sodium phosphate monobasic ($NaH_2PO_4$), and sodium carbonate ($Na_2CO_3$) at a weight ratio of about 1:1:5:2.26, respectively, to ensure optimum chemical reaction and $CO_2$ release at selected operation conditions (about 25° C. in the case of the experimental studies performed during development). Both $NaH_2PO_4$ and $Na_2CO_3$ are considered as effervescent agents (i.e., the solid chemicals that mainly generate the $CO_2$ gas when added to water), while sodium dodecyl sulfate (SDS) is considered a surfactant (for reducing surface tension and increasing spreading and wetting properties). Three multi-walled carbon nanotube (MWCNT) volume percentages (vol. %) were selected then employed in the approximately 1:1:5:2.26 weight ratio of the powders matrix that was used in the fabrication process of the effervescent tablets, taking into account that the tablets were to be added to 90 mL of water in the experimentation stage. The three vol. % used were 0.05 vol. %, 0.10 vol. %, and 0.15 vol. %. Table 1 shows the mass of each material included in the powder's mixture based on the employed weight ratio and selected vol. %.

| Vol. % | Material Weight | | | | Total Powder Weight (g) |
|---|---|---|---|---|---|
| | MWCNTs (g) | SDS (g) | $NaH_2PO_4$ (g) | $Na_2CO_3$ (g) | |
| 0.05 | 0.095 | 0.095 | 0.473 | 0.214 | 0.875 |
| 0.10 | 0.189 | 0.189 | 0.945 | 0.427 | 1.750 |
| 0.15 | 0.284 | 0.284 | 1.418 | 0.641 | 2.625 |

Figure 2:
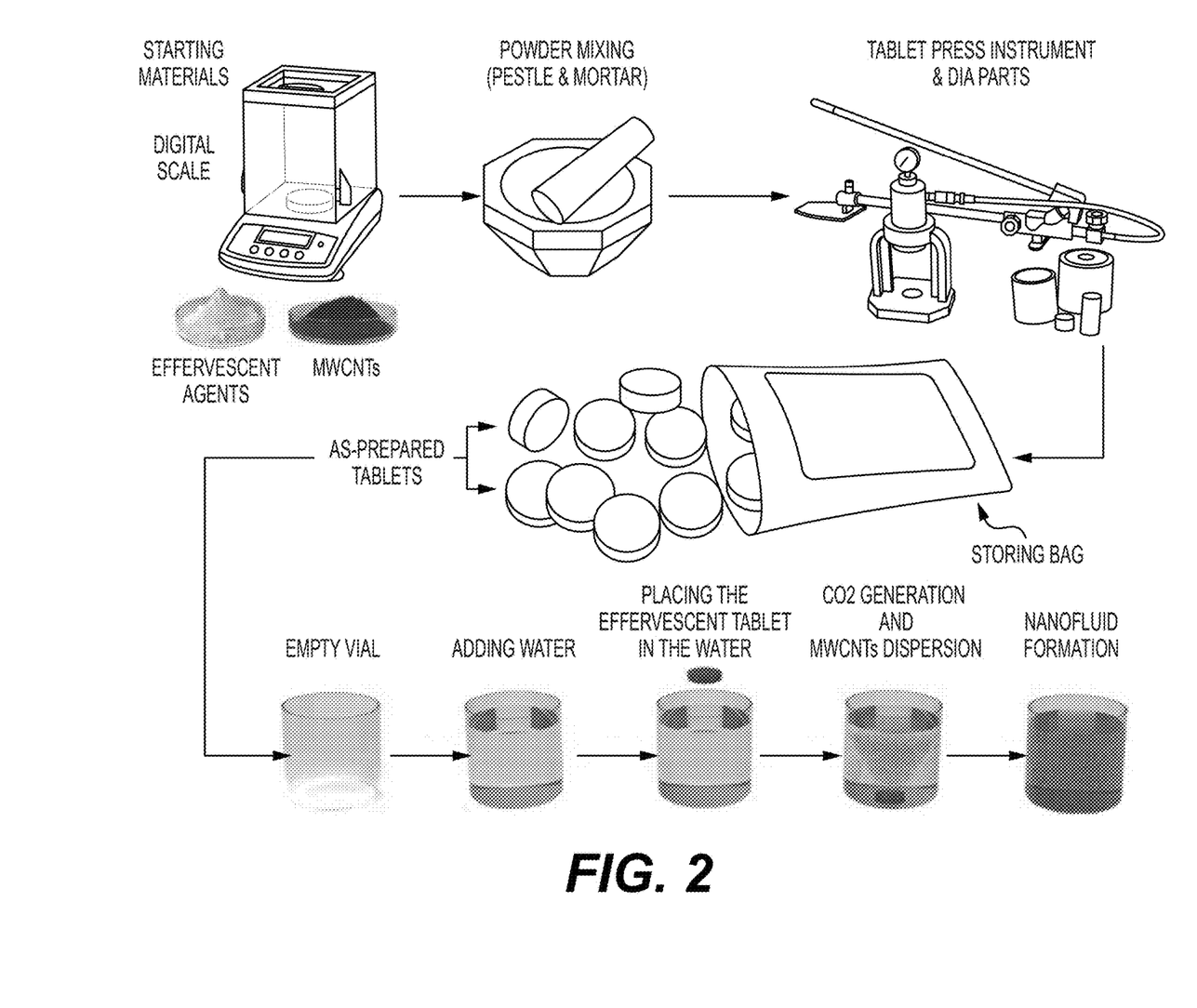
FIG. 2 illustrates example elements used in the formation of effervescent tablets and a resulting suspension.

With reference to FIG. 2, the fabrication of effervescent tablets used during the research and development stage is described, as a non-limiting example of a fabrication process to produce carbon based effervescent tablets. First, the mixing of the powders, (MWCNTs, SDS, $NaH_2PO_4$, $Na_2CO_3$) was performed for about 15 min using a pestle and mortar tool. Next, the as-mixed powders were placed in a 2.5 cm inner diameter die then compressed into tablets at 100 kN, using a pneumatic compression instrument. Afterwards, the as-prepared effervescent tablets were dropped in a vial containing 90 mL (25° C.) of the base fluid to start the reaction, which led to the formation of the suspension. Two types of base fluids were used, namely distilled water and seawater, where their properties at 25° C. are shown in Table 2 and Table 3, respectively. The surrounding temperature in which the production of the suspension took place was 21° C. and the suspension fabrication process was considered completed once the immersed tablet was fully dissolved.

TABLE 2

Distilled Water As-Obtained Properties

| Result | Unit | Value |
|---|---|---|
| Appearance | — | Colorless |
| Conductivity | mS/cm | <0.001 |
| Thermal conductivity | W/m · K | 0.606 |
| Viscosity | mPas | 0.89 |
| Density | g/cm³ | 0.983 |
| Specific heat capacity | kJ/kg · K | 4.182 |
| pH | — | 5.77 |
| Bi-carbonate alkalinity | mg/L | 2.86 |
| Carbonate alkalinity | mg/L | 0 |
| OH-alkalinity | mg/L | 0 |
| Total alkalinity | mg/L | 2.86 |
| Sodium | mg/L | <0.01 |
| Calcium | mg/L | <0.01 |
| Magnesium | mg/L | <0.01 |
| Potassium | mg/L | <0.01 |
| Strontium | mg/L | <0.01 |
| Barium | mg/L | <0.15 |
| Iron | mg/L | <0.01 |
| Lithium | mg/L | <0.01 |
| Silicon | mg/L | <0.01 |
| Boron | mg/L | <0.01 |
| Chloride | mg/L | <0.01 |
| Sulfate | mg/L | <1 |
| Total Dissolved Solids (calculated) | mg/L | 3.02 |

TABLE 3

Seawater As-Obtained Properties

| Result | Unit | Value |
|---|---|---|
| Appearance | — | Colorless |
| Conductivity | mS/cm | 20.4 |
| Thermal conductivity | W/m · K | 0.609 |
| Viscosity | mPas | 1.19 |
| Density | g/cm³ | 1.010 |
| Specific heat capacity | kJ/kg · K | 4.009 |
| pH | — | 7.26 |
| Bi-carbonate alkalinity | mg/L | 121.84 |
| Carbonate alkalinity | mg/L | 0 |
| OH-alkalinity | mg/L | 0 |
| Total alkalinity | mg/L | 121.84 |
| Sodium | mg/L | 4,443.50 |
| Calcium | mg/L | 931.26 |
| Magnesium | mg/L | 668.9 |
| Potassium | mg/L | 108.46 |
| Strontium | mg/L | 13.05 |
| Barium | mg/L | 0.03 |
| Iron | mg/L | 0.04 |
| Lithium | mg/L | 0.1 |
| Silicon | mg/L | 10.56 |
| Boron | mg/L | 3.3 |
| Chloride | mg/L | 7,128.12 |
| Sulfate | mg/L | 3,400 |
| Total Dissolved Solids (calculated) | mg/L | 16,829.16 |

Figure 3:
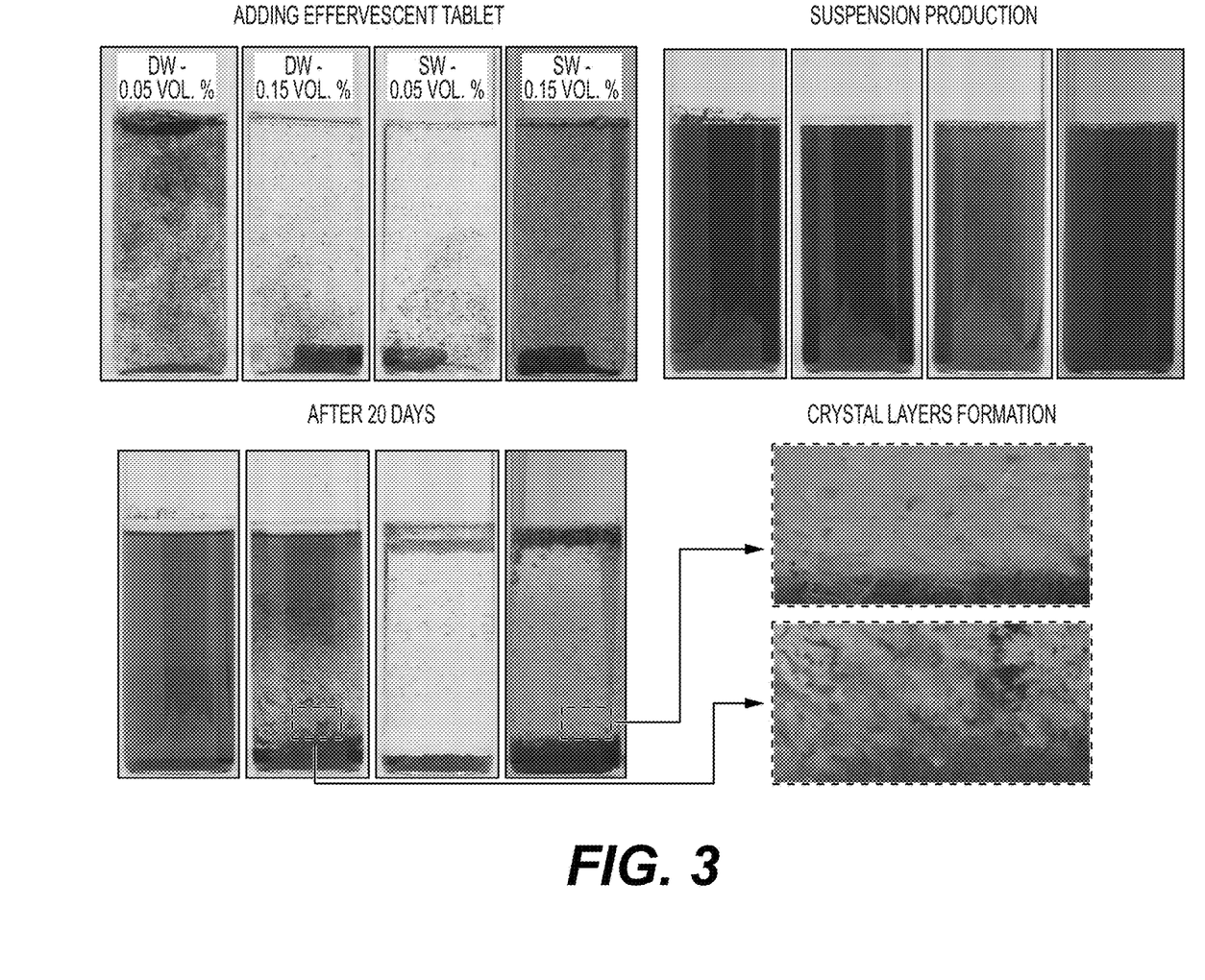
FIG. 3 illustrates example suspensions formed by an effervescent tablet in distilled water and saltwater using different effervescent tablets content.
Figure 4:
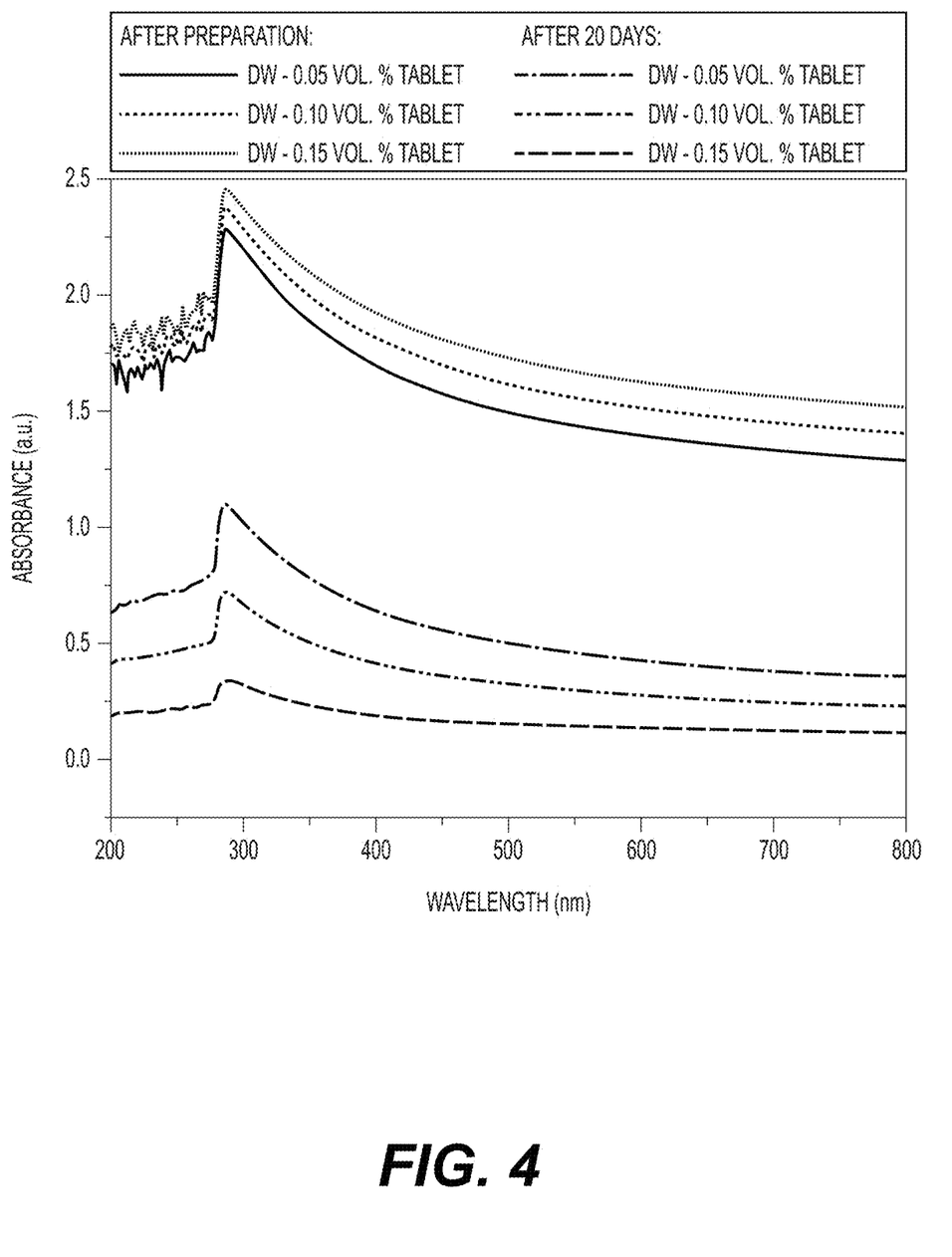
FIG. 4 is a plot showing results of ultraviolet-visible spectroscopy analysis performed on a suspension formed by an effervescent tablet in distilled water.
Figure 5:
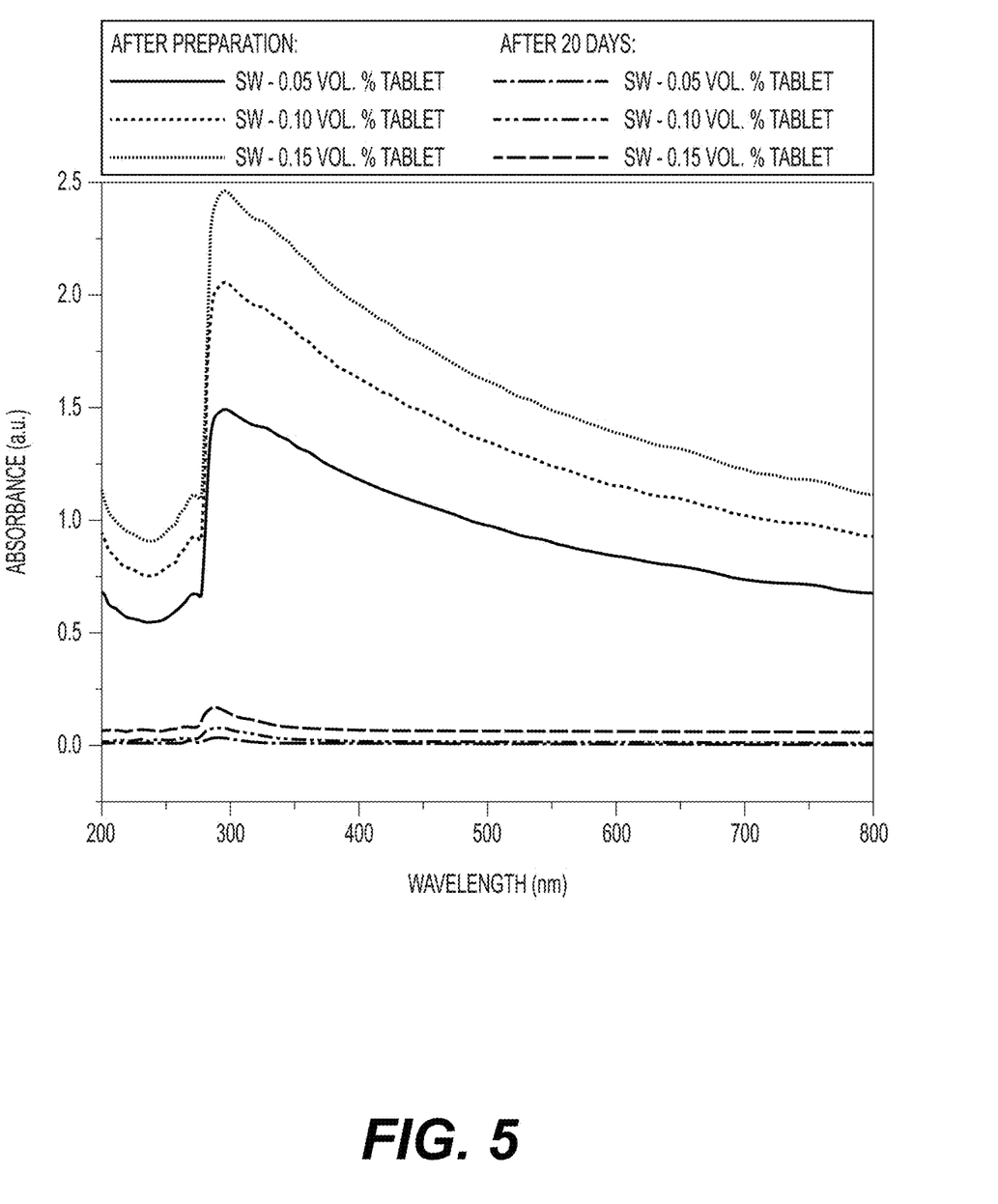
FIG. 5 is a plot showing results of ultraviolet-visible spectroscopy analysis performed on a suspension formed by an effervescent tablet in saltwater.
Figure 6:
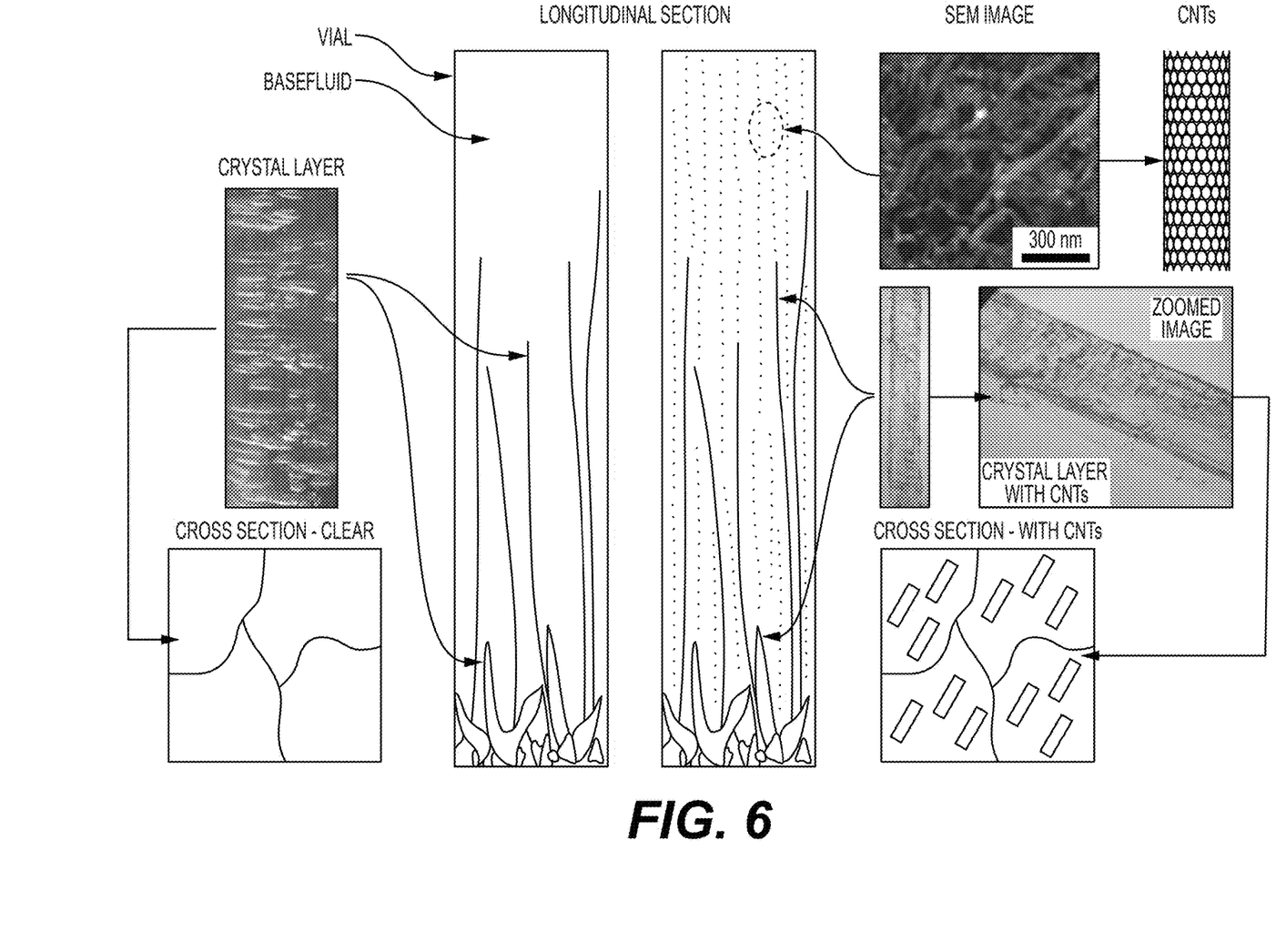
FIG. 6 illustrates crystallization occurring as a result of the introduction of an effervescent tablet into a base fluid.
Figure 7:
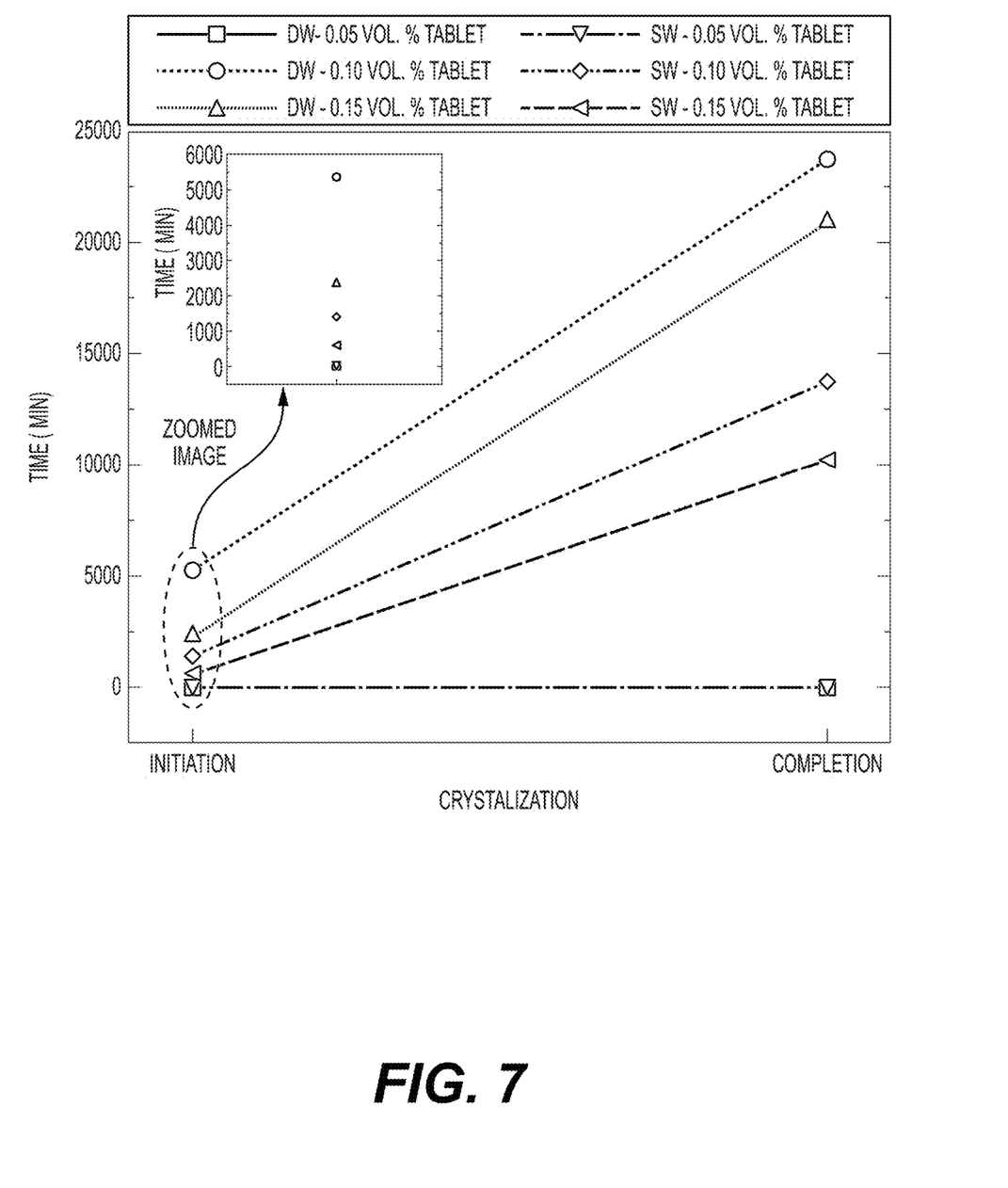
FIG. 7 is a plot of time involved in crystal growth for different effervescent tablets and base fluids.

Once the production phase was completed, the suspensions were subjected to dispersion stability tests, namely sedimentation photographical capturing and UV-vis analysis, for 20 days. FIG. 3 demonstrates the sedimentation photographical capturing results, whereas FIG. 4 and FIG. 5 show the output of the UV-vis analysis for distilled water-based and seawater-based suspensions, respectively. The results of both dispersed particle stability tests showed that suspensions made with distilled water were more stable than those fabricated with seawater. Furthermore, unlike the distilled water-based suspensions, the seawater-based samples showed almost complete loss of stability on day 20. This can be attributed to the dissolved salts being attached to the dispersed carbon material, and thus increasing both its size and weight. Moreover, the formation of crystal layers was found in the suspensions of 0.10 vol. % and 0.15 vol. %, for both distilled water and seawater base fluids, as shown in FIG. 3. In addition, the crystal layers that were formed had embedded some of the dispersed carbon material on the surface and within its structure, as demonstrated in FIG. 6. Such newly introduced phenomenon was possibly achieved due to the use of effervescent tablets of certain effervescent agents type and concentration, carbon-based particles, type of base fluid used and its volume, surrounding temperature, and growth duration. It is important to note that the higher the level of dispersed particles stability the more embedded particle will exist on and within the formed crystal layers. In addition, if the effervescent tablets were to be fabricated without the carbon-based materials, the crystal layers would still form in the hosting liquid but without the embedded particles, as shown in FIG. 6. Based on the amount of content used in the effervescent tablets and the type of base fluid employed, the time required for the crystal layers to start growing and reach their full formation point can vary, as seen in FIG. 7.

Figure 8:
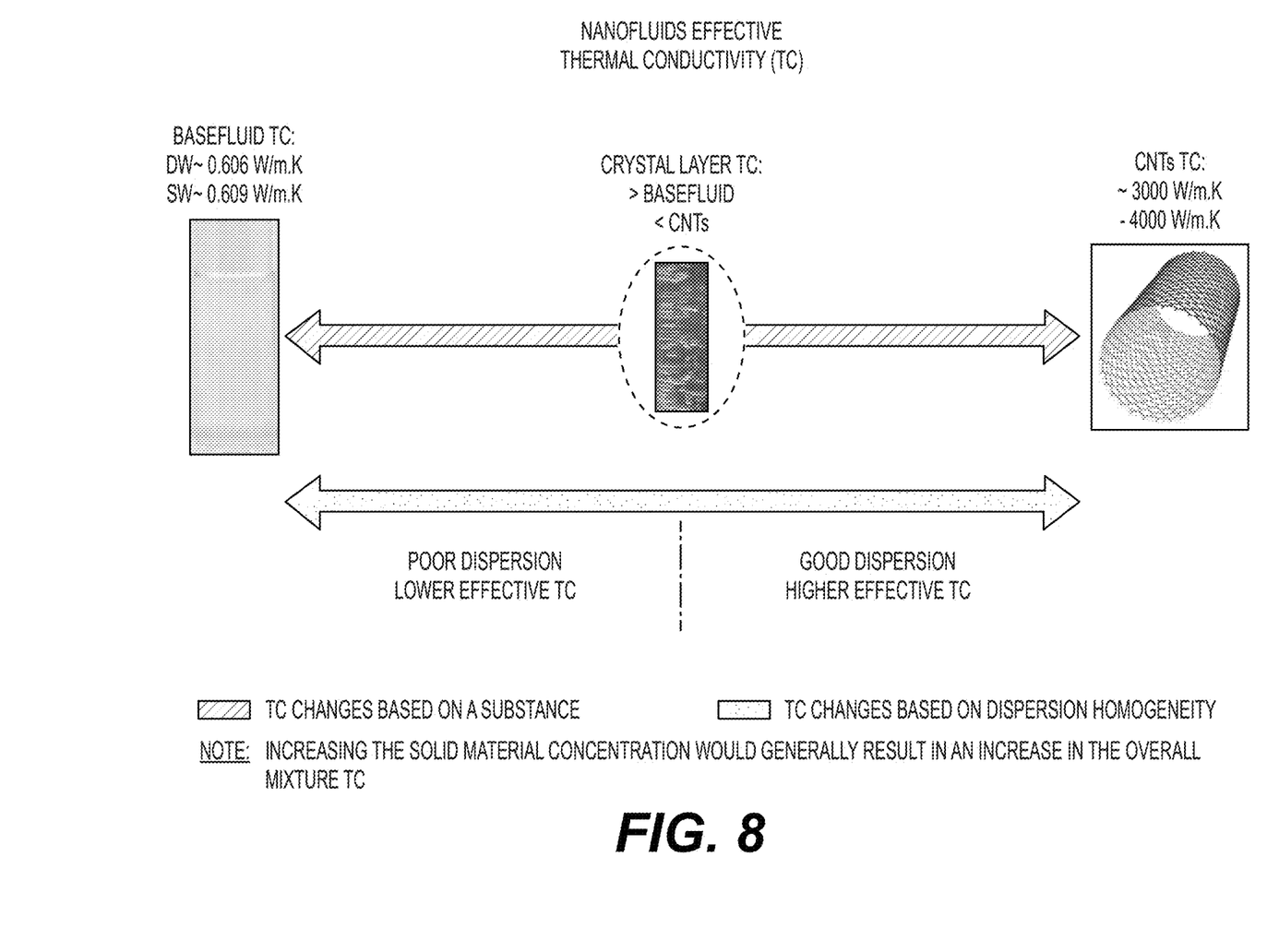
FIG. 8 is a representation of the relationship between thermal conductivity variation depending on different substance and dispersion stability conditions.

The importance of the formed effervescent tablets is that, for thermal applications, the formed (or grown) crystal layers as well as the dispersed particles both have higher thermal conductivity compared to their host liquid, as illustrated in FIG. 8. In addition, the existence of the crystal layers along with the dispersed particles would also mean that the thermal system utilizing such advanced fluid would have higher heat absorption. In the case of a solar still desalination system, this would also result in a higher amount of sunlight being absorbed by the feed contained in the system (due to the crystal layers with embedded particles), and eventually would lead to an increase in the feed water temperature. Since growth time and surrounding temperature are key factors in the successful production of such types of suspensions, new solar still water treatment systems are proposed as shown in the example of FIG. 1.

It is to be understood that the water treatment systems and processes are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A water desalination process, comprising:
introducing at least one effervescent tablet into a base fluid within a source container to form a suspension;
feeding the suspension into a water desalination chamber from the source container;
regulating a fluid level in the water desalination chamber using a valve to automatically introduce additional suspension from the source container;
heating fluid in the water desalination chamber to create a vapor; and
collecting vapor condensate and directing the collected vapor condensate towards a collection trough.

2. The water desalination process as recited in claim 1 wherein the effervescent tablet comprises a nanomaterial having a higher thermal conductivity than the base fluid.

3. The water desalination process as recited in claim 2 wherein the effervescent tablet comprises multi-walled carbon nanotubes (MWCNT).

4. The water desalination process as recited in claim 3, wherein the volume percent of multi-walled carbon nanotubes in the base fluid is at least 0.10%.

5. The water desalination process as recited in claim 4, wherein the volume percent of multi-walled carbon nanotubes in the base fluid is at least 0.15%.

6. The water desalination process as recited in claim 3, wherein the effervescent tablet comprises sodium dodecyl sulfate.

7. The water desalination process as recited in claim 6, wherein the effervescent tablet comprises monosodium phosphate.

8. The water desalination process as recited in claim 7, wherein the effervescent tablet comprises sodium carbonate.

9. The water desalination process as recited in claim 8, wherein the effervescent tablet comprises multi-walled carbon nanotubes, sodium dodecyl sulfate, monosodium phosphate, and sodium carbonate in a weight ratio of about 1:1:5:2.26.

10. The water desalination process as recited in claim 1, further comprising: forming one or more crystals within the suspension resulting from the introduction of the effervescent tablet.

11. The water desalination process as recited in claim 1, wherein heating the fluid in the water desalination chamber is performed by solar radiation through a transparent window of the water desalination chamber.

12. The water desalination process as recited in claim 1, further comprising:
heating the suspension in the source container by solar radiation.

13. A water desalination process, comprising:
introducing at least one effervescent tablet into a source container holding a base fluid to form a suspension;
exposing the suspension in the source container to solar radiation;
feeding the suspension into a water desalination chamber;
regulating a fluid level in the water desalination chamber using a valve to automatically introduce additional suspension from the source container;
heating the suspension in the water desalination chamber by solar radiation entering through a transparent window of the water desalination chamber to create vapor;
collecting vapor condensate formed on one or more walls of the water desalination chamber; and
forming one or more crystals in the suspension as a result of introducing the effervescent tablet into the base fluid.

* * * * *